United States Patent [19]

Andrews et al.

[11] Patent Number: 5,202,063
[45] Date of Patent: Apr. 13, 1993

[54] METHOD FOR MAKING ENCAPSULATED LIQUID CRYSTAL MATERIAL

[75] Inventors: Brackin L. Andrews; Gilbert Garza, both of Fremont; Mark F. Wartenberg, San Jose; William Seeley, Newark, all of Calif.

[73] Assignee: Raychem Corporation, Menlo Park, Calif.

[21] Appl. No.: 834,438

[22] Filed: Feb. 12, 1992

Related U.S. Application Data

[63] Continuation-in-part of Ser. No. 653,795, Feb. 11, 1991, abandoned.

[51] Int. Cl.$^5$ .......................... B01J 13/02; G02F 1/13; C09K 19/00
[52] U.S. Cl. ........................ 264/4.6; 359/52; 359/103; 252/314; 427/162
[58] Field of Search ............ 264/4.1, 4.3, 4.6; 252/299.01, 299.1, 312, 314; 359/51, 52, 103, 106; 428/402.2; 427/162

[56] References Cited

U.S. PATENT DOCUMENTS

| | | | |
|---|---|---|---|
| 3,578,844 | 5/1971 | Churchill et al. | 359/51 X |
| 3,872,050 | 3/1975 | Benton et al. | 359/51 X |
| 4,435,047 | 3/1984 | Fergason | 359/52 |
| 4,662,720 | 5/1987 | Fergason | 359/52 |
| 4,671,618 | 6/1987 | Wu et al. | 359/52 |
| 4,685,771 | 8/1987 | West et al. | 359/51 X |
| 4,688,900 | 8/1987 | Doane et al. | 359/52 |
| 4,707,080 | 11/1987 | Fergason | 359/52 |
| 4,834,508 | 5/1989 | Fergason | 359/51 |
| 4,946,623 | 8/1990 | Tabony | 252/314 |
| 4,950,052 | 8/1990 | Fergason et al. | 359/52 |
| 5,049,307 | 9/1991 | Tabony | 252/299.01 |
| 5,138,472 | 8/1992 | Jones et al. | 359/52 |

FOREIGN PATENT DOCUMENTS 156615 10/1985 European Pat. Off.
204537 12/1986 European Pat. Off.

Primary Examiner—Robert L. Stoll
Assistant Examiner—John M. Covert
Attorney, Agent, or Firm—Yuan Chao; Herbert G. Burkard

[57] ABSTRACT

Encapsulated liquid crystal material is made by mixing liquid crystals, a containment medium, and a carrier medium made of a water-miscible monohydric alcohol and water in the proportion between 5:95 and 60:40 weight/weight to form an emulsion; applying the emulsion onto a substrate and drying the emulsion to remove the carrier medium.

9 Claims, 3 Drawing Sheets

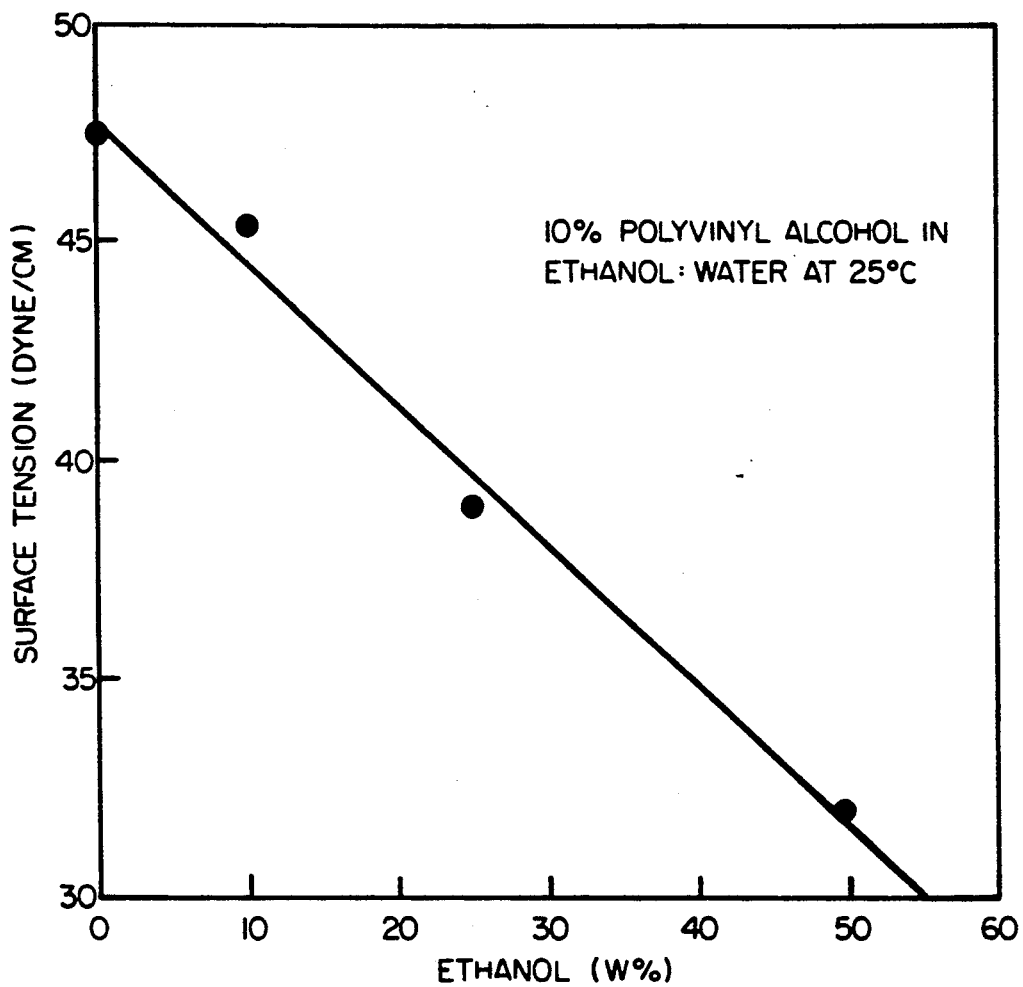
FIG_1

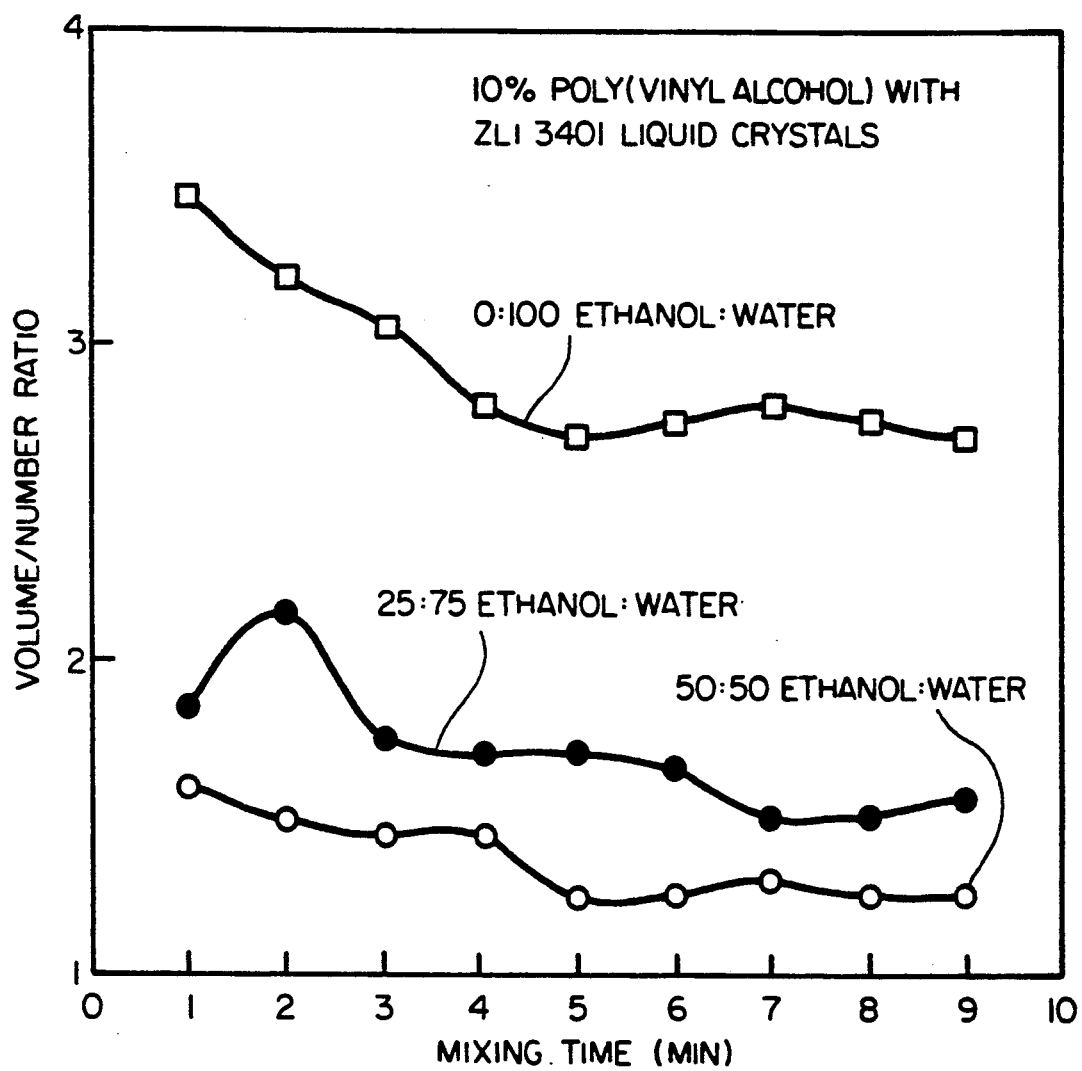
FIG_2

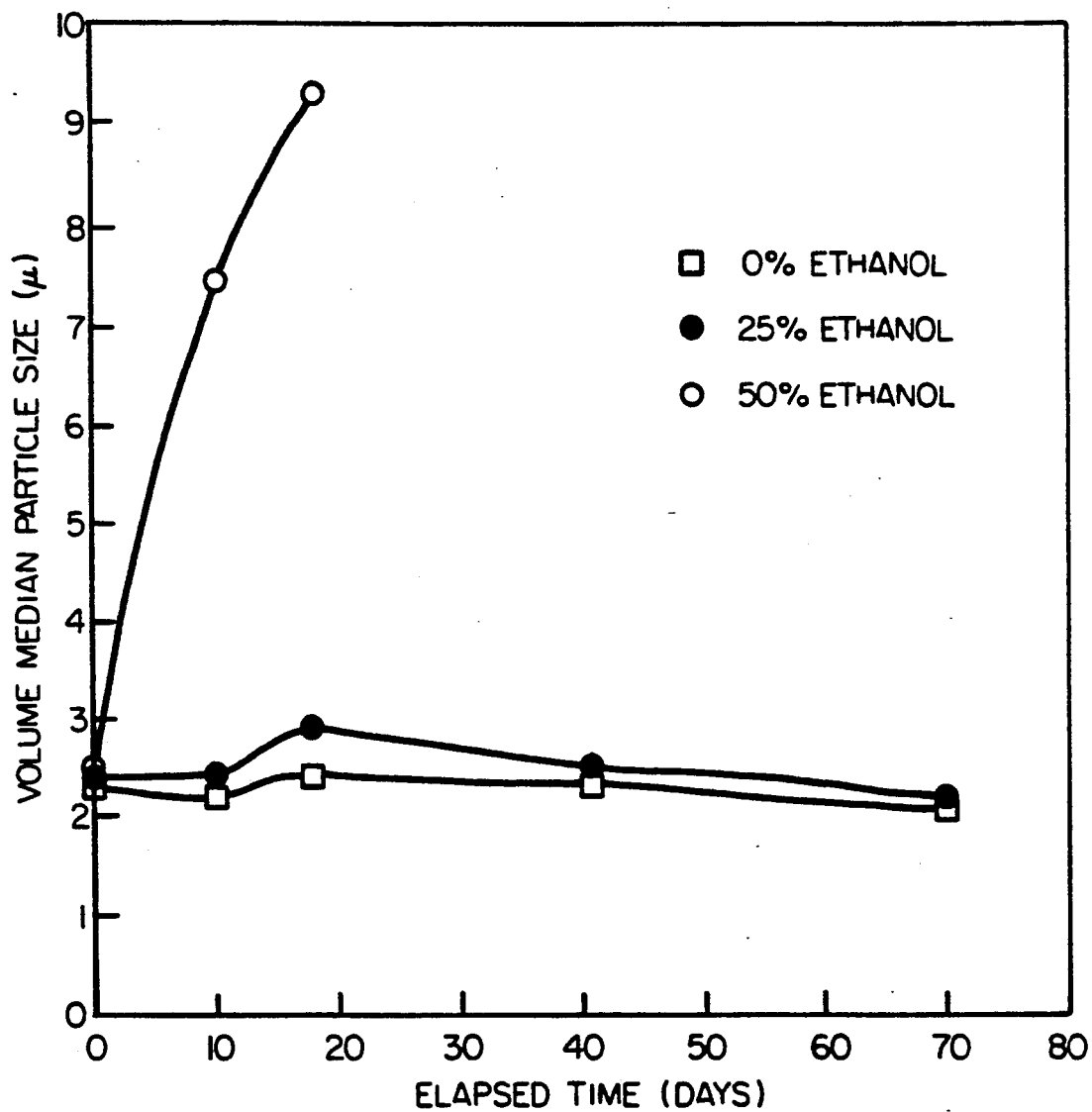
FIG_3

METHOD FOR MAKING ENCAPSULATED LIQUID CRYSTAL MATERIAL

CROSS-REFERENCE TO RELATED APPLICATIONS

This application is a continuation-in-part of application Ser. No. 07/653,795, filed Feb. 11, 1991, now abandoned, the disclosure of which is incorporated herein by reference.

BACKGROUND OF THE INVENTION

This invention relates to a process for making encapsulated liquid crystal material suitable for use in electro-optical devices.

Many types of liquid crystal devices are known. Among these the most well known are displays, but other liquid crystal devices include privacy screens, sunroofs, membrane switches, and shutters. A preferred type of liquid crystal device employs encapsulated liquid crystal material, wherein liquid crystals are encapsulated or dispersed in a matrix or containment medium such as a polymer. When a voltage corresponding to a sufficiently strong electric field is applied across the encapsulated liquid crystal material (the "field-on" condition), the alignment of the liquid crystals is re-oriented in accordance with the field, so that incident light is transmitted. Conversely, in the absence of such a voltage (the "field-off" condition) the alignment of the liquid crystals is random and/or influenced by the liquid crystal-matrix interface, so that the liquid crystal material scatters incident light. The applied voltage at which the liquid crystal material begins to change from its field-off condition to its field-on condition is called the threshold voltage. Encapsulated liquid crystal materials and their use in devices are discussed in Fergason, U.S. Pat. Nos. 4,435,047 (1984), 4,579,423 (1986), 4,605,284, 4,616,903, and 4,707,080; Doane et al., U.S. Pat. No. 4,890,902; West et al., U.S. Pat. No. 4,685,771 (1987); and Doane et al., U.S. Pat. No. 4,688,900 (1987), the disclosures of which are incorporated herein by reference.

The size and size distribution of the liquid crystals droplets contained in the matrix can affect the performance of the liquid crystal material. When an encapulated liquid crystal material is prepared, the droplets will be produced in a range of sizes. The smaller droplets have a higher threshold voltage, so that in a material having a substantial amount of smaller, submicron sized droplets, or fines, switching all the liquid crystal droplets to the field-on condition requires a higher voltage. The result is that material having a large amount of fines will appear hazy until such higher voltage is applied, and will not switch sharply between a nontransmissive state and a transmissive state. An encapsulated liquid crystal material in which the droplet size distribution is relatively narrow will also have a sharper turn-on effect, because more of the droplets will have the same threshold voltage. It is also taught in Wu et al., U.S. Pat. No. 4,671,618 (1987) that the switching time of encapsulated liquid crystal material is affected by the droplet size.

In one method of making encapsulated liquid crystal material, an emulsion of the containment medium and liquid crystals is initially produced, optionally together with a carrier medium. The use of water as a carrier medium is taught in the aforementioned Fergason U.S. Pat. No. 4,435,047. The emulsion is spread onto a substrate and allowed to dry, to produce a film or sheet of encapsulated liquid crystal material. It is desirable that the emulsion be readily spreadable onto the substrate, to form uniform and defect-free films. Further, it is also desirable that the carrier medium be readily volatilized, so that the films dry quickly and are less likely to incur defects or be contaminated. Otherwise, there may be redistribution of the droplets, leading to an inhomogeneous dried film, due to variations in the flatness and/or surface energy of the substrate.

SUMMARY OF THE INVENTION

An object of this invention is to make encapsulated liquid crystal material having liquid crystal droplets with narrow size distribution. Another object of this invention is to make encapsulated liquid crystals in which the amount of fine droplets is reduced. Yet another object of this invention is to provide an improved method of making films of encapsulated liquid crystal material in which the emulsion is readily coated onto a substrate and dries quickly to provide high quality films with reduced numbers of defects.

According to this invention, encapsulated liquid crystal material is made by:
  providing liquid crystals and a containment medium;
  providing a carrier medium comprising a water-miscible monohydric alcohol and water in the proportion between 5:95 and 60:40 weight/weight;
  mixing the liquid crystals, containment medium, and carrier medium to form an emulsion;
  applying the emulsion onto a substrate; and
  drying the emulsion to remove the carrier medium.

BRIEF DESCRIPTION OF THE DRAWINGS

FIG. 1 shows the effect of the amount of ethanol in the carrier medium on the surface tension of the carrier medium.

FIG. 2 shows the effect of the amount of ethanol in the carrier medium on the drop size distribution as a function of mixing time.

FIG. 3 compares the stabilities of emulsions made with various amounts of ethanol in the carrier medium.

DESCRIPTION OF THE PREFERRED EMBODIMENTS

In encapsulated liquid crystal material, discrete volumes of liquid crystals are encapsulated, dispersed, embedded or otherwise contained in a containment medium or matrix. "Liquid crystals" denotes a composition having liquid crystalline properties, whether that composition is a single discrete liquid crystalline compound, a mixture of different liquid crystalline compounds, or a mixture of liquid crystalline and non-liquid crystalline compounds. Preferably, the liquid crystals are nematic or operationally nematic. Other types of liquid crystals, such as smectics and cholesterics can also be encapsulated by the methods of this invention.

Liquid crystals have typically elongated molecular shapes, with a tendency to align or orient themselves with their long molecular axes parallel to each other. This alignment causes liquid crystals to be anisotropic, meaning that their measured physical, optical, and other properties are dependent on the direction of measurement (parallel or perpendicular to the direction of alignment). Further, the alignment direction can be influenced by an external stimulus, such as an electrical or magnetic field, causing the liquid crystals to exhibit a particular value of a physical characteristic in one direction when the stimulus is absent, but rapidly switching to a different value when the stimulus is applied. It is because of their anisotropy and their ready realignment that liquid crystals are useful as materials for displays.

The containment medium is preferably a polymeric material which is soluble in the carrier medium. Specific preferred containment media include but are not limited to poly(vinyl alcohol) and poly(vinyl alcohol) copolymers, gelatin, polyelectrolytes such as Gantrez TM (polymethyl vinyl ether/maleic anhydride, from GAF Corporation) and Carbopole TM (carboxy polymethylene polymer, from B. F. Goodrich Chemical Corporation) poly(ethylene oxide), poly(vinyl pyrrolidone), cellulosic polymers, natural gums, and the like. Poly(vinyl alcohol) is a preferred containment medium because of facility with which it forms emulsions with liquid crystals.

Typically, encapsulated liquid crystal material is substantially nontransparent in the absence of a sufficient electric field (the "field-off" state) and substantially transparent in the presence of a sufficient electric field (or "field-on" state). The electric field induces a change in the alignment of the liquid crystals, in turn causing the encapsulated liquid crystal material to switch from a highly light-scattering (and/or absorbent) state to a highly non-scattering and substantially transparent state. Generally, it is preferred that the liquid crystals have a positive dielectric anisotropy and that the ordinary index of refraction of the liquid crystals be matched with the refractive index of the containment medium, while the extraordinary index of refraction is substantially mismatched therewith. The physical principles by which such encapsulated liquid crystal material operates is described in further detail in the aforementioned references, particularly the patents to Fergason. In those portions of the encapsulated liquid crystal material to which a sufficient electric field is applied, the transition from a non-transparent state to a transparent state occurs, while adjacent areas to which no electric field has been applied remain non-transparent.

Pleochroic dyes have been mixed with liquid crystals to form a solution therewith. The molecules of pleochroic dyes generally align with the molecules of liquid crystals, so that the application of the electric field affects not only the predominant alignment of the liquid crystals, but also of the pleochroic dye. As the extent of the absorption of incident light by the pleochroic dye depends on its orientation relative tot he incident light, the application of an external stimulus to a liquid crystal-pleochroic dye combination also provides a means for the controlled attenuation of light. Generally, the pleochroic dye is in a substantially more light absorbing state in the field-off condition and in a substantially more light transmissive state in the field-on condition. (Thus, as used herein, the term "liquid crystals" also means, in context, liquid crystals containing pleochroic dye dissolved therein.) Pleochroic dyes may be used in encapsulated liquid crystals to form colored displays. A display capable of displaying colored images can be formed by depositing side by side red, blue, and green pixels.

We have discovered that where a solution of a water-miscible monohydric alcohol and water is used as the carrier medium in preparing an emulsion of liquid crystals and the containment medium, encapsulated liquid crystal material having a narrower distribution of liquid crystal droplets is produced. We believe, without wishing to be bound by theory, that the effect is due to the reagglomeration of fines and to the production of droplets of fairly small size at lower shear stresses due to reduced surface tension. Further, the lower surface tension of the emulsions makes them more readily spreadable as uniform, faster drying films. Suitable water miscible monhydric alcohols include ethanol, methanol, isopropanol, n-propanol, and t-butanol. A preferred alcohol is ethanol. The alcohol-water ratio is between 5:95 and 60:40 weight:weight, preferably between 10:90 and 50:50 weight:weight. While infinitely miscible monhydric alcohols are preferred, partially miscible ones, such a n-, iso- and 2-butanol, may be used up to the extent of their respective solubilities. At increasing alcohol levels, there may be some solubilization of the liquid crystals into the alcohol:water, or some precipitation of the liquid crystals. Such effects can be avoided by choosing the appropriate combination of liquid crystals and alcohol in the appropriate proportions, as can be readily determined empirically.

Monohydric alcohols are preferred over polyhydric alcohols because of their higher volality. A polyhydric alcohol, such as glycerol, would be very difficult to remove because of its low volatility and high affinity for the containment media such as poly(vinyl alcohol). (Further, we have found that glycerol does not provide the particle size distribution improvements observed by us with our monhydric alcohols.) Thus, the preferred monohydric alcohols are those whose boiling points at one atmosphere are not significantly higher than that of water, i.e., below about 120° C. With more volatile monohydric alcohols, drying the emulsion and removal of the containment medium at ambient temperatures (i.e., about 20°-30° C.) without special heating techniques which would be costly and/or damaging the the liquid crystal or containment medium is feasible.

A ratio of 10% by weight containment medium in the carrier medium (e.g., 10% (w) poly(vinyl alcohol) in 50:50 (w/w) ethanol:water) has been found to be preferred. Those skilled in the art will appreciate that the desirable amount of carrier medium is dependent on the molecular weight and chemical characteristics of the containment medium. We have found that mixing the appropriate ratio of these to produce a mixture of viscosity 100 cps generally produces a system with which it is convenient to work, but a wide range of other concentration/viscosity combinations can also work.

The mixing of the liquid crystals, containment medium, and carrier medium can be accomplished with equipment such as propeller blade mixers, homogenizers, and colloid mills. Good results have been obtained with a Cole-Parmer mixer with 3-prong propeller blades driven by a permanent magnet DC motor with solid state controllers which provide a uniform mixing speed regardless of torque.

FIG. 1 shows that the inclusion of ethanol in a carrier medium comprising 10% poly(vinyl alcohol) lowers its surface tension, making the resulting emulsion easier to spread on substrates such as indium tin oxide (ITO) coated polyester or glass. ITO coated polyester or glass is a preferred substrate because the ITO can serve as a transparent electrode material for applying the threshold voltage to the liquid crystal material, while the polyester or glass provides physical support and protection.

FIG. 2 shows the effect of carrier medium composition on the polydispersity of the emulsion produced, as a function of the mixing time. Polydispersity is defined as the volume median diameter divided by the number median diameter (V/N ratio). A V/N ratio of 1 corresponds to a monodisperse system. As can be seen, increasing the ethanol concentration decreases the V/N ratio.

The particle size of emulsions produced can be measured by a variety of methods, including with a Coulter Counter Multisizer apparatus and various light scattering techniques. We prefer to use the Multisizer. The volume, area, and number medians are calculated, and thence, V/N.

FIG. 3 shows that emulsions based on carrier media having up to at least 25% ethanol are as stable as those made with water as the carrier medium. However, emulsions made with a carrier medium of 50:50 ethanol:water show instability, indicating that they are preferably promptly used. After they are prepared, they can be diluted with water, to reduce the alcohol concentration and produce a stable emulsion with a narrow droplet size distribution. Alternatively, part of the alcohol can be removed, thereby reducing its concentration, by evaporation, preferably at reduced pressure using a rotary evaporator.

The droplet size distribution in the emulsion can be further improved by filtering the emulsion initially produced through a filter or membrane material. As the use of an ethanol:water carrier medium produces a relatively small amount of fine droplets, such a filtration step, which removes the larger droplets, leads to an emulsion having especially narrow droplet size distribution. A preferred filter material is Versapor membrane, made by Gelman Sciences (Ann Arbor, Mich.), in the 1 $\mu$m to 5 $\mu$m range.

The practice of this invention can be further understood by reference to the following examples, which are provided by means of illustration and not of limitation.

EXAMPLE 1

A mixture of 30 g of liquid crystal (ZLI-3401 from Merck GmbH, Darmstadt, Germany) with 100 g of 10% poly(vinyl alcohol) (Airvol 205, Air Products and Chemicals, King of Prussia, Pa.) solution in 50:50 ethanol:water was prepared by high shear mixing using a propeller blade mixer (Stir-Pak heavy duty mixer with 1 inch blades, Cole-Parmer, Chicago, Ill.) at 2300 rpm for 3 minutes.

This procedure produced an emulsion of unusually narrow droplet size distribution: 1.46 $\mu$m by number, 1.77 $\mu$m by area, and 1.92 $\mu$m by volume, corresponding to a V/N ratio equal to 1.92/1.46=1.32.

EXAMPLE 2

The procedure of Example 1 was repeated, except that the mixing was performed for 10 min at 1500 rpm, to produce an emulsion with this droplet size distribution: 1.98 $\mu$m by number, 5.66 $\mu$m by area, and 7.27 $\mu$m by volume (V/N=7.27/1.98=3.67). This emulsion was filtered three times through a 3 $\mu$m Versapor membrane filter (Gelman Sciences, Ann Arbor, Mich.) to produce an emulsion with droplet size distribution: 1.84 $\mu$m by number, 2.40 $\mu$m by area, 2.64 $\mu$m by volume (V/N=2.64/1.84=1.43).

EXAMPLE 3

A mixture of 7 g of liquid crystal (BDH-AG, British Drug House, Poole, England) and 70 g of 10% poly(vinyl alcohol) (Airvol 205, Air Products & Chemicals, King of Prussia, Pa.) solution in 50:50 t-butanol:water was prepared by high shear mixing using a propeller blade mixer (Stir-Pak mixer with 1 inch diameter blade, Cole Palmer, Chicago, Ill.) at 6600 rpm for 8 min. The speed was then reduced to 1500 rpm and 63 g of deionized water was added over the next minutes, followed by one more minute of mixing to produce an emulsion with this droplet size distribution: 3.16 $\mu$ by number, 12.8 $\mu$ by area, and 15.5 $\mu$ by volume (V/N ratio=15.5/3.16=4.90).

This emulsion was filtered three times through a 3 $\mu$ Versapor membrane filter (Gelman Science, Ann Arbor, Mich.) to produce an emulsion droplet with this size distribution: 1.61 $\mu$ by number, 1.99 by area, and 2.19 by volume (V/N=2.19/1.61=1.36).

What is claimed is:

1. A method of making an encapsulated liquid crystal material, comprising the steps of:
    providing liquid crystals and a containment medium selected from the group consisting of poly(vinyl alcohol) and poly(vinyl alcohol) copolymers, gelatin, polymethyl vinyl ether/maleic anhydride, carboxy polymethylene polymer, poly(ethylene oxide), poly(vinyl pyrrolidone), cellulosic polymers, and natural gums;
    providing a carrier medium comprising a water-miscible monohydric alcohol and water in the proportion between 5:95 and 60:40 weight/weight;
    mixing the liquid crystals, containment medium, and carrier medium to form an emulsion;
    applying the emulsion onto a substrate; and
    drying the emulsion to remove the carrier medium.

2. A method according to claim 1 in which the liquid crystals are operationally nematic liquid crystals.

3. A method according to claim 1 in which the liquid crystals include a pleochroic dye.

4. A method according to claim 1, 2, or 3, wherein the alcohol to water proportion if between 10:90 and 50:50 weight:weight.

5. A method according to claim 1, 2, or 3, wherein the alcohol is selected from the group consisting of ethanol, methanol, isopropanol, n-propanol, and t-butanol.

6. A method according to claim 1, 2, or 3, further comprising the step of filtering the emulsion.

7. A method according to claim 1, 2, or 3, further comprising the step of diluting the emulsion with water after the mixing step.

8. A method according to claim 1, 2, or 3, further comprising the step of removing part of the alcohol from the emulsion by evaporation after the mixing step.

9. A method according to claim 1, 2, or 3, wherein the containment medium is poly(vinyl alcohol) and the alcohol is ethanol.

* * * * *